(No Model.)

I. E. MUSHETTE.
COMBINED SHOE AND GLOVE BUTTONER.

No. 525,154. Patented Aug. 28, 1894.

Witnesses,

Inventor,
Ida E. Mushette
By Dewey & Co
Attys

UNITED STATES PATENT OFFICE.

IDA E. MUSHETTE, OF OAKLAND, CALIFORNIA.

COMBINED SHOE AND GLOVE BUTTONER.

SPECIFICATION forming part of Letters Patent No. 525,154, dated August 28, 1894.

Application filed January 5, 1894. Serial No. 496,828. (No model.)

*To all whom it may concern:*

Be it known that I, IDA E. MUSHETTE, a citizen of the United States, residing in East Oakland, county of Alameda, State of California, have invented an Improvement in Combined Shoe and Glove Buttoners; and I hereby declare the following to be a full, clear, and exact description of the same.

My invention relates to the class of hooks for buttoning shoes and gloves, and it consists in the novel combination of the shoe-button hook and the glove-button hook, which I shall hereinafter fully describe and specifically claim.

The object of my invention is to provide a single article combining both hooks, said article being of simple construction, compact and neat in form, adapted to be readily carried in any pocket, with entire protection for and from both hooks, and easily adapted to be extended for use when required.

Figure 1:
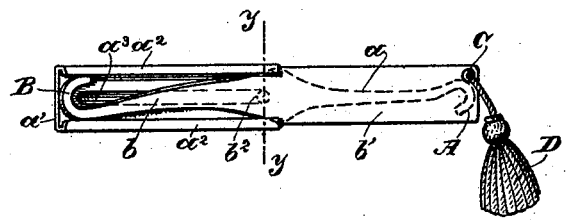
Figure 2:
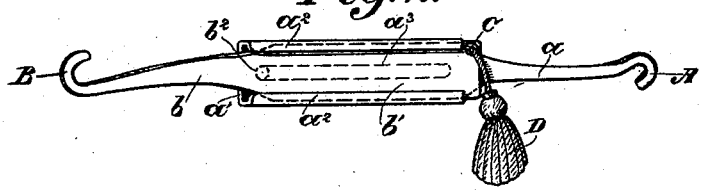
Figure 3:
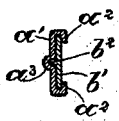

Referring to the accompanying drawings for a more complete explanation of my invention,—Figure 1 is an elevation of my combined buttoner shown closed or contracted. Fig. 2 is a view showing it open or extended. Fig. 3 is a cross section on line $y$—$y$ of Fig. 1.

A is the smaller hook which serves as the glove buttoner. Its shank $a$ is formed with a body $a'$ which is provided with inturned side flanges $a^2$, and with a central internal groove $a^3$.

B is the larger hook serving as the shoe buttoner. Its shank $b$ is formed with the body $b'$ which is fitted and adapted to slide within the inturned flanges of the body of the hook A, and said body $b'$ has an inwardly extending stud $b^2$ which fits and plays within the groove $a^3$ of the body $a'$ of the smaller hook. This stud and groove connection between the two bodies serves to limit the indrawing and the extension movement of the two hooks. In the indrawn or contracted position of the two hooks the two bodies are extended in line, but the hooks are drawn in toward each other and the body of each protects the hook of the other; that is to say, the bodies are made long enough and wide enough that when the two bodies are extended in line each hook will draw in flush with or past the end of the other body, and being of less width, each hook is thereby caused to lie beside the other's body and to be perfectly protected, so that the clothing is not liable to be caught by the hooks, and the whole device may be readily inserted in and removed from a pocket. In the extended position of the device wherein the bodies are brought together to lie on one another, the hooks are thereby uncovered and are ready for use. It is obvious that instead of making the body of the larger hook slide or telescope within the body of the smaller hook, the reverse construction may be made, in which the body of the larger hook might receive that of the smaller hook. This construction is immaterial so long as the body of one fits and slides upon the body of the other.

In order to contract and extend the two parts with ease I have a hole C made in the end of the body $b'$ and in this hole I fit a suitable hand-hold, such as a ring, a chain, or other device, or as I have here shown a string or tassel D by which the body $b'$ may be moved out and in. This tassel or hand-hold also serves the further purpose of enabling the device to be readily extracted from any small or specially prepared pocket to which it may be fitted.

Having thus described my invention, what I claim as new, and desire to secure by Letters Patent, is—

1. A combined shoe and glove buttoner consisting in two oppositely projecting buttoners of approximately equal length, connected and sliding one upon the other at their inner ends or body portions, and means for limiting such sliding movement, whereby when the buttoners are slid inwardly their outer or working ends will be protected by the body portions of the other buttoner, and when moved outwardly an elongated double ended buttoner will be formed, substantially as herein described.

2. A buttoner comprising two oppositely arranged button hooks sliding one upon the other; one of which has guide flanges along the edges of its inner or body portion receiving the edges of the inner portion or body of the other, and means for limiting such sliding movement, substantially as herein described.

3. A buttoner comprising the two oppositely arranged button hooks sliding one upon the other, guide flanges along the edges of the inner portion or body of one hook and receiving the edges of the body of the other hook, a longitudinal groove in one body section and a tongue on the other working in said groove, substantially as herein described.

4. A buttoner comprising two oppositely arranged hooks of approximately equal length secured together side by side and sliding one upon the other for the purpose set forth, and a hand hold secured to the inner end of the body of one of the hooks, substantially as herein described.

In witness whereof I have hereunto set my hand.

IDA E. MUSHETTE.

Witnesses:
S. H. NOURSE,
H. F. ASCHECK.